(12) United States Patent
Tenny et al.

(10) Patent No.: US 11,356,809 B2
(45) Date of Patent: Jun. 7, 2022

(54) DISTRIBUTED LOCATION MANAGEMENT FUNCTION

(71) Applicant: Huawei Technologies Co., Ltd., Shenzhen (CN)

(72) Inventors: Nathan Edward Tenny, Portland, OR (US); Andrey Krendzel, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/983,632

(22) Filed: Aug. 3, 2020

(65) Prior Publication Data

US 2020/0367022 A1    Nov. 19, 2020

Related U.S. Application Data

(63) Continuation of application No. PCT/CN2019/080280, filed on Mar. 29, 2019.
(Continued)

(51) Int. Cl.
*H04W 4/029* (2018.01)
*H04W 64/00* (2009.01)

(52) U.S. Cl.
CPC ........... *H04W 4/029* (2018.02); *H04W 64/00* (2013.01)

(58) Field of Classification Search
CPC ............................. H04W 4/029; H04W 64/00
See application file for complete search history.

(56) References Cited

U.S. PATENT DOCUMENTS

2012/0210350 A1   8/2012  McCoy et al.
2013/0223626 A1   8/2013  Edge et al.
(Continued)

FOREIGN PATENT DOCUMENTS

CN         1505427 A      6/2004
CN       101232700 A      7/2008
(Continued)

OTHER PUBLICATIONS

Huawei, et al., ":Introduction to the Solution for key issue on support of low LCS latency," S2-182130, SA WG2 Meeting #126, Feb. 26-Mar. 2, 2018, Montreal, Canada, 2 pages.
(Continued)

*Primary Examiner* — Marisol Figueroa
(74) *Attorney, Agent, or Firm* — Conley Rose, P.C.

(57) ABSTRACT

Described herein is a network node comprising a processor that executes instructions to receive a location service request for a user equipment (UE); transmit a reachability request for the UE to an access and mobility management function (AMF); receive a reachability response comprising reachability information of the UE from the AMF; determine whether to perform positioning procedures related to the location service request locally or to perform positioning procedures related to the location service request remotely based, in part, on the reachability information; based on a determination to perform the positioning procedures remotely, determine a distributed location management function (LMFd) to process the location service request based, at least in part, on the reachability information; transmit the location service request to the LMFd; receive a location service result from the LMFd; and transmit, responsive to the location service request, a UE position estimate determined based on the location service result.

21 Claims, 7 Drawing Sheets

Related U.S. Application Data (60) Provisional application No. 62/781,173, filed on Dec. 18, 2018, provisional application No. 62/652,155, filed on Apr. 3, 2018.

(56) References Cited

U.S. PATENT DOCUMENTS

| | | | |
|---|---|---|---|
| 2016/0330707 A1 | 11/2016 | Das et al. | |
| 2018/0284149 A1* | 10/2018 | Kommi | G01P 15/08 |
| 2018/0324740 A1* | 11/2018 | Edge | H04W 4/025 |
| 2019/0037636 A1 | 1/2019 | Kim et al. | |
| 2019/0053010 A1* | 2/2019 | Edge | H04W 64/00 |
| 2020/0252902 A1* | 8/2020 | Edge | H04W 4/02 |

FOREIGN PATENT DOCUMENTS

| | | |
|---|---|---|
| CN | 102076085 A | 5/2011 |
| CN | 102685607 A | 9/2012 |
| WO | 2017142362 A1 | 8/2017 |

OTHER PUBLICATIONS

3GPP TR 23.731 V0.2.0 "3rd Generation Partnership Project; Technical Specification Group Services and System Aspects; Study on Enhancement to the 5GC LoCation Services (Release 16)," Mar. 2018, 45 pages.

Qualcomm Incorporated, "Addition of an LMF Based Location Solution," SA WG2 Meeting #126, S2-182300, Montreal, Canada, Feb. 26-Mar. 2, 2018, 20 pages.

"3rd Generation Partnership Project;Technical Specification Group Services and System Aspects; Location Services (LCS); Service description; Stage 1 (Release 16)," 3GPP TS 22.071 V16.0.0, Jul. 2020, 56 pages.

"3rd Generation Partnership Project;Technical Specification Group Core Network and Terminals; Location management procedures (Release 16)," 3GPP TS 23.012 V16.0.0, Jul. 2020, 71 pages.

"3rd Generation Partnership Project; Technical Specification Group Services and System Aspects; Functional stage 2 description of Location Services (LCS) (Release 16)," 3GPP TS 23.271 V16.0.0, Jul. 2020, 188 pages.

"3rd Generation Partnership Project;Technical Specification Group Services and System Aspects; System architecture for the 5G System (5GS); Stage 2 (Release 16)," 3GPP TS 23.501 V16.5.1, Aug. 2020, 440 pages.

"3rd Generation Partnership Project;Technical Specification Group Services and System Aspects; Procedures for the 5G System (5GS); Stage 2 (Release 16)," 3GPP TS 23.502 V16 5.0, Jul. 2020, 594 pages.

"3rd Generation Partnership Project;Technical Specification Group Services and System Aspects; Study on Enhancement to the 5GC Location Services (Release 16)," 3GPP TR 23.731 V16 0.0, Dec. 2018, 170 pages.

* cited by examiner

DISTRIBUTED LOCATION MANAGEMENT FUNCTION

CROSS-REFERENCE TO RELATED APPLICATIONS

This application is a continuation of PCT Patent Application No. PCT/CN2019/080280, filed on Mar. 29, 2019, which claims priority to U.S. Provisional Patent Application No. 62/652,155, filed Apr. 3, 2018 by Nathan Edward Tenny, et al., and titled "Distributed Location Management Function," and U.S. Provisional Patent Application No. 62/781,173, filed Dec. 18, 2018 by Nathan Edward Tenny, et al., and titled "Distributed Location Management Function." The disclosures of all of the aforementioned applications are hereby incorporated in their entirety by reference thereto.

TECHNICAL FIELD

The present application relates to systems and methods for locating a mobile device and, in particular, to a distributed location management function.

BACKGROUND

As the use of mobile devices become more common, a need for positioning of the mobile device has arisen. Positioning may include determining the geographical location and/or velocity of a device, e.g., a user equipment (UE) based on measuring radio signals. As used herein mobile device and UE may be used interchangeably. UE may include any device that allows a user to access a network, for example, mobile telephones, smart devices, wearables, laptops, tablets, navigation equipment, etc. Positioning is useful in commercial and non-commercial applications. For example, an advertiser uses positioning to provide advertisements to a UE relative to the location of the UE, and emergency service providers use positioning to respond to distress calls from a UE. Positioning is also useful to optimize network performance. The position information is requested by and reported to a client (e.g., an application) associated with the UE, or by a client within or attached to the network.

SUMMARY

A first aspect relates to a network node comprising a memory having instructions stored therein; and a processor in communication with the memory, wherein the processor executes the instructions to receive a location service request for a user equipment (UE); transmit a reachability request for the UE to an access and mobility management function (AMF); receive a reachability response comprising reachability information of the UE from the AMF; determine whether to perform positioning procedures related to the location service request locally or to perform positioning procedures related to the location service request remotely based, at least in part, on the reachability information; based on a determination to perform the positioning procedures remotely determine a distributed location management function (LMFd) to process the location service request based, at least in part, on the reachability information; transmit the location service request to the LMFd; receive a location service result from the LMFd; and transmit, responsive to the location service request, a UE position estimate determined based on the location service result.

The network node facilitates an efficient solution for performing location services in a network using a LMFd in certain situations where the LMFd provides improved accuracy or efficiency over performing location services at the network node.

In a first implementation form of the network node according to the first aspect as such, the location service result comprises the UE position estimate. Receiving a location service result including the UE position estimate from the LMFd increases processing efficiency at the network node.

In a second implementation form of the network node according to the first aspect as such or any preceding implementation form of the first aspect, the location service result comprises measurements and the processor further executes the instructions to calculate the UE position estimate based on the measurements. Receiving a location service result including measurements from the LMFd increases processing efficiency at the LMFd.

In a third implementation form of the network node according to the first aspect as such or any preceding implementation form of the first aspect, the location service request comprises a requested location services (LCS) quality of service (QoS). A location service request including the LCS QoS provides for more efficient selection of a network node or LMFd to perform the location services.

In a fourth implementation form of the network node according to the first aspect as such or any preceding implementation form of the first aspect, the determination to perform the positioning procedures remotely is further based upon the requested LCS QoS. The network node determines to perform the positioning procedures remotely more effectively based on the LCS QoS.

In a fifth implementation form of the network node according to the first aspect as such or any preceding implementation form of the first aspect, the LMFd is determined further based upon the requested LCS QoS. The network node determines which LMFd to perform the positioning procedures more effectively based on the LCS QoS.

In a sixth implementation form of the network node according to the first aspect as such or any preceding implementation form of the first aspect, the location service request is transmitted to the LMFd via an Nlmf_DetermineLocation service operation. An Nlmf_DetermineLocation service operation improves efficiency of transmitting the information for a location service request.

A second aspect relates to a method for performing location services, the method comprising receiving, by a network node, a location service request for a user equipment (UE); transmitting, by the network node, a reachability request for the UE to an access and mobility management function (AMF); receiving, by the network node, a reachability response comprising reachability information of the UE from the AMF; determining, by the network node, whether to perform positioning procedures related to the location service request locally or to perform positioning procedures related to the location service request remotely based, at least in part, on the reachability information; based on a determination to perform the positioning procedures remotely determining, by the network node, a distributed location management function (LMFd) to process the location service request based, at least in part, on the reachability information; transmitting, by the network node, the location service request to the LMFd; receiving, by the network node, a location service result from the LMFd; and transmitting, by the network node responsive to the location service request, a UE position estimate determined based on the location service result. The method facilitates an efficient solution for performing location services in a network using a LMFd in certain situations where the LMFd provides improved accuracy or efficiency over performing location services at a network node.

In a first implementation form of the method according to the second aspect as such, the location service result comprises the UE position estimate. Receiving a location service result including the UE position estimate from the LMFd increases processing efficiency at the network node.

In a second implementation form of the method according to the second aspect as such or any preceding implementation form of the second aspect, the location service result comprises measurements and the method further comprises calculating the UE position estimate based on the measurements. Receiving a location service result including measurements from the LMFd increases processing efficiency at the LMFd.

In a third implementation form of the method according to the second aspect as such or any preceding implementation form of the second aspect, the location service request comprises a requested location services (LCS) quality of service (QoS). A location service request including the LCS QoS provides for more efficient selection of a network node or LMFd to perform the location services.

In a fourth implementation form of the method according to the second aspect as such or any preceding implementation form of the second aspect, the determination to perform the positioning procedures remotely is further based upon the requested LCS QoS. The network node determines to perform the positioning procedures remotely more effectively based on the LCS QoS.

In a fifth implementation form of the method according to the second aspect as such or any preceding implementation form of the second aspect, the LMFd is determined further based upon the requested LCS QoS. The network node determines which LMFd to perform the positioning procedures more effectively based on the LCS QoS.

In a sixth implementation form of the method according to the second aspect as such or any preceding implementation form of the second aspect, the location service request is transmitted to the LMFd via an Nlmf_DetermineLocation service operation. An Nlmf_DetermineLocation service operation improves efficiency of transmitting the information for a location service request.

A third aspect relates to a computer program comprising a program code for performing the method according to the second aspect or any of its implementation forms when executed on a computer. Thus, the method can be performed in an automatic and repeatable manner. The computer program can be performed by the apparatus. The apparatus can be programmably-arranged to perform the computer program.

A fourth aspect relates to a network node comprising memory means having instructions stored therein and processor means in communication with the memory means, wherein the processor means executes the instructions to perform the method according to the second aspect or any of its implementation forms.

A fifth aspect relates to a network node comprising a memory having instructions stored therein; and a processor in communication with the memory, wherein the processor executes the instructions to receive a location service request for a user equipment (UE) from a central location management function (LMFc), the location service request comprising reachability information of the UE; instigate positioning operations with one or more of the UE or a radio access network (RAN) node; receive location information from one or more of the UE or the RAN node; and transmit a location service result to the LMFc. The network node facilitates an efficient solution for performing location services in a networking at the network node in certain situations where the network node provides improved accuracy and/or efficiency over performing location services at the LMFc.

In a first implementation form of the network node according to the fifth aspect as such, the positioning operations comprise transmitting location assistance data to the UE. Transmitting location assistance data to the UE improves the efficiency of performing location services at the UE.

In a second implementation form of the network node according to the fifth aspect as such or any preceding implementation form of the fifth aspect, the location service result comprises positioning measurements. Transmitting positioning measurements to the LMFc increases efficiency of the location services performed at the UE and/or network node.

In a third implementation form of the network node according to the fifth aspect as such or any preceding implementation form of the fifth aspect, the location service result comprises a UE location estimate. Transmitting a location estimate to the LMFc increases efficiency of the location services performed at the LMFc.

In a fourth implementation form of the network node according to the fifth aspect as such or any preceding implementation form of the fifth aspect, the processor is further configured to calculate a UE position estimate based on the location information. Calculating the position estimate by the network node increases efficiency of the location services performed at the UE and/or LMFc.

A sixth aspect relates to a method for performing location services, the method comprising receiving, by a network node, a location service request for a user equipment (UE) from a central location management function (LMFc), the location service request comprising reachability information of the UE; instigating, by the network node, positioning operations with one or more of the UE or a radio access network (RAN) node; receiving, by the network node, location information from one or more of the UE or the RAN node; and transmitting, by the network node, a location service result to the LMFc. The network node facilitates an efficient solution for performing location services in a networking at the network node in certain situations where the network node provides improved accuracy and/or efficiency over performing location services at the LMFc.

In a first implementation form of the method according to the sixth aspect as such, the positioning operations comprise transmitting location assistance data to the UE. Transmitting location assistance data to the UE improves the efficiency of performing location services at the UE.

In a second implementation form of the method according to the sixth aspect as such or any preceding implementation form of the sixth aspect, the location service result comprises positioning measurements. Transmitting positioning measurements to the LMFc increases efficiency of the location services performed at the UE and/or network node.

In a third implementation form of the method according to the sixth aspect as such or any preceding implementation form of the sixth aspect, the location service result comprises a UE location estimate. Transmitting a location estimate to the LMFc increases efficiency of the location services performed at the LMFc.

In a fourth implementation form of the method according to the sixth aspect as such or any preceding implementation form of the sixth aspect, the method further comprises calculating a UE position estimate based on the location information. Calculating the position estimate by the network node increases efficiency of the location services performed at the UE and/or LMFc.

A seventh aspect relates to a computer program comprising a program code for performing the method according to the sixth aspect or any of its implementation forms when executed on a computer. Thus, the method can be performed in an automatic and repeatable manner. The computer program can be performed by the apparatus. The apparatus can be programmably-arranged to perform the computer program.

An eighth aspect relates to a network node comprising memory means having instructions stored therein and processor means in communication with the memory means, wherein the processor means executes the instructions to perform the method according to the sixth aspect or any of its implementation forms.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein are systems and methods for a distributed location management function. The distributed location management function (LMFd) may perform functions that a location management function (LMF) performs, but in a distributed manner at a location closer to the UE being positioned. In systems with a LMFd, a centrally located LMF (LMFc) may be utilized. As used herein, LMF and LMFc may be used interchangeably in systems that include one or more LMFd. An LMFd near the UE being positioned may improve latency and/or measurement results in positioning the UE. The LMFd may be located at or near a radio access network (RAN) node, e.g., an evolved node B (eNB) or next-generation node B (gNB or ng-eNB), which may also be referred to as base stations. As used herein the term RAN may include next generation RAN (NG-RAN), e.g., a fifth generation (5G) RAN. Decreasing latency in the positioning operation may result in increased accuracy of the positioning operation. Embodiments herein may be described in relation to a 5G network using a NG-RAN. The techniques of the described embodiments may be applied to other types of networks or RANs (e.g., non-5G) where positioning of devices is performed.

Figure 1:
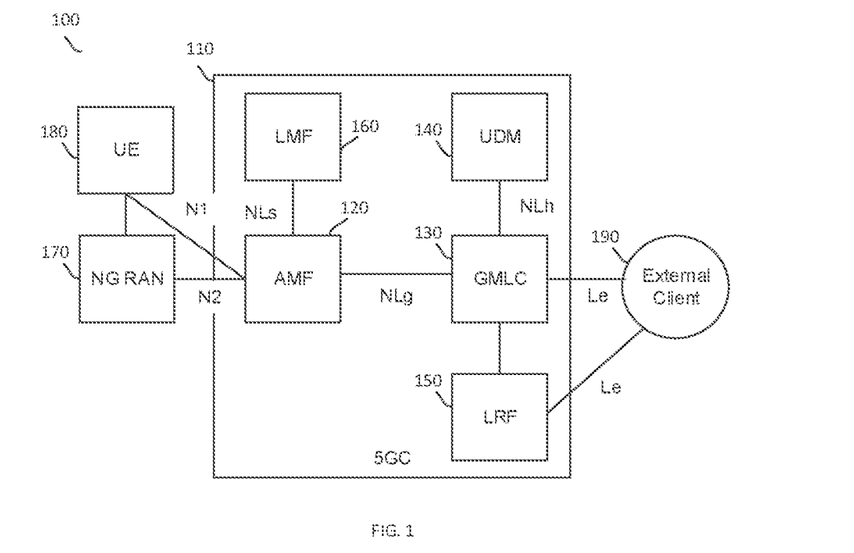
FIG. 1 is a diagram of an embodiment of a 5G network positioning architecture.

FIG. 1 is a diagram of an embodiment of a 5G network 100. The 5G network 100 may include a core 110, a NG-RAN 170, a UE 180, and an external location services (LCS) client 190. The NG-RAN 170 may include a wireless transmission portion of the 5G network 100 that communicates with the UE 180. The NG-RAN 170 may include one or more eNBs or gNBs or other RAN nodes. The UE 180 can communicate with the core 110 via the NG-RAN 170. In some embodiments, nodes within the core 110 communicate directly with the UE 180. External LCS client 190 may be a node that is not part of the core 110 that wishes to locate the UE 180 via the core 110 and the NG-RAN 170.

Core 110 may include a number of nodes that perform various functions of the 5G system. While several nodes are depicted in the core 110, other nodes may be part of the core 110 but not pictured. Access and mobility management function (AMF) 120 may function similarly to the long-term evolution (LTE) mobility management entity (MME). AMF 120 interacts with the NG-RAN 170 and/or the UE 180 for access to the other nodes in the core 110. AMF 120 may manage location services for various regulatory services. AMF 120 can also provide transport for location service messages between location management function (LMF) 160 and the UE 180 and/or the NG-RAN 170. Gateway mobile location center (GMLC) 130 may be the first node of the core 110 that is accessed by the external LCS client 190. External LCS client 190 accesses the GMLC 130 in an attempt to locate the UE 180. GMLC 130 handles the location request from the external LCS client 190 and interacts with other nodes in the core 110. GMLC 130 provides the results of a location request to the external LCS client 190. Unified data management function (UDM) 140 stores information regarding which AMF is serving a particular UE. UDM 140 may also store data regarding privacy requirements of UEs. Location retrieval function (LRF) 150 may provide location information when, for example, an emergency call, e.g., 911, is initiated from a UE. The location information provided by the LRF 150 can be used in routing the emergency call to an appropriate emergency responder. The LMF 160 supports location determination for a UE, e.g., UE 180. The LMF 160 obtains downlink location measurements or a location estimate from the UE 180, uplink location measurements from the NG-RAN 170, and/or non-UE associated assistance data from the NG-RAN 170. While a single instance of each node and a single UE 180 is shown in FIG. 1, multiple instances of some or all may be present in a 5G network.

Figure 2:
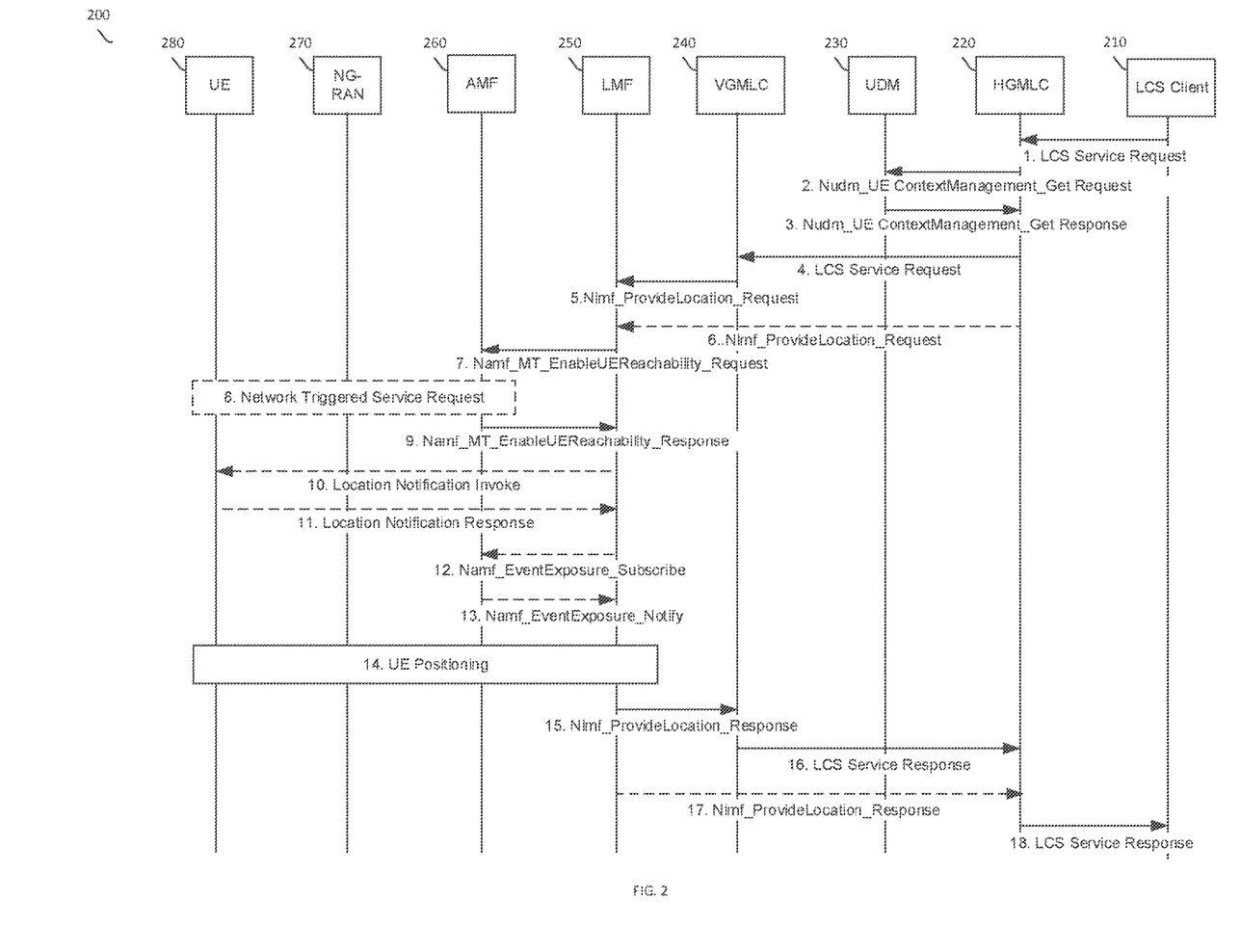
FIG. 2 is a diagram of an embodiment of a 5G mobile terminated location request (MT-LR) for a roaming UE.

FIG. 2 is a diagram of an embodiment of a 5G mobile terminated location request (MT-LR) 200 for a roaming UE 280. At step 1, an external location services (LCS) client 210, sends a location request to a home-GMLC (HGMLC) 220 in the home public land mobile network (HPLMN) of the UE 280. The HGMLC 220 may verify the authorization of the LCS client 210 to locate the UE 280. The HGMLC 220 may also verify privacy requirements of the UE 280. When the LCS client 210 is authorized to locate the UE 280 and no privacy requirements forbid positioning by the LCS client 210, the flow continues with step 2.

At step 2, the HGMLC 220 invokes an LCS service request operation towards the home UDM 230 of the UE 280. The LCS service request operation may include the generic public subscription identifier (GPSI) or subscription permanent identifier (SUPI) of the UE 280. The LCS service request operation may comprise a Nudm_UE ContextManagement_Get Request message.

At step 3, the UDM 230 returns the address of the AMF 260 and possibly an address of visited-GMLC (VGMLC) 240 and/or an address of the LMF 250 in the visited public land mobile network (VPLMN). The UDM 230 may also return subscribed privacy requirements for the UE 280 when the privacy requirements are not stored in the HGMLC 220. The UDM 230 may return the data to the HGMLC 220 in a Nudm_UE ContextManagement_Get Response message.

At step 4, when an address of the VGMLC 240 was not returned in step 3, the HGMLC 220 may use the network function (NF) repository function (NRF) service in the HPLMN to select an available VGMLC 240 in the VPLMN based on the VPLMN address contained in the AMF address received in step 3. The HGMLC 220 may forward the location request to the VGMLC 240 and include the address of the AMF 260, the identity (e.g., SUPI) of the UE 280, any LMF address received in step 3, and any privacy requirements for the UE 280.

At step 5, the VGMLC 240 determines an LMF 250 in the VPLMN to receive the location request. The VPLMN may include one or more LMF devices. VGMLC 240 may determine an LMF 250 based on any suitable criteria (e.g., location QoS, type of LCS client, VGMLC identity (ID)) and independently of the AMF 260. As one example, the VGMLC 240 may be configured with addresses for all LMFs in the VPLMN and could select the LMF 250 on a round robin basis. In some embodiments, when an AMF is allowed to use some but not all LMFs in the VPLMN, the VGMLC 240 is configured with the allowed LMFs for each AMF, and could then select the LMF 250 based on specific criteria (e.g., QoS), or randomly. In some embodiments, the VGMLC 240 may use the NRF service in the VPLMN to request a set of available LMFs in the VPLMN and may then select the LMF 250 based on specific criteria (e.g., QoS), or randomly. In some embodiments, when the UE 280 registers with a 5G core, the AMF 260 selects the LMF 250 and provides the address of the LMF 250 to the UDM 230 along with the address of the AMF 260. The UDM 230 then provides the address of the LMF 250 in step 3 to the HGMLC 220 which then provides the address to the VGMLC 240 in step 4. This alternative may be supported for UEs from certain HPLMNs and/or UEs with a subscription to 5G MT-LR usage. Once the VGMLC 240 has selected LMF 250, the VGMLC 240 invokes an LCS request operation to forward the location request to the LMF 250. The LCS request operation may include a Nlmf_ProvideLocation Request message. In some embodiments, when the VGMLC 240 and the LMF 250 functions are combined, step 5 may be omitted.

At step 6, as an optional optimization, instead of performing steps 4 and 5, the HGMLC 220 may determine or select the LMF 250 (e.g., based on the VPLMN ID, AMF 260 address, using the NRF service, or by receiving an LMF 250 address from the UDM 230 in step 3). In this case, the HGMLC 220 invokes the LCS request operation (e.g., Nlmf_ProvideLocation Request) to forward the location request directly to the LMF 250. When this optimization is used, the HGMLC 220 may need to support the LMF service based interface (SBI) (Nlmf). Therefore, when the HPLMN operator wishes to avoid support of the Nlmf SBI by combining GMLCs with LMFs, steps 4 and 5 may be used rather than step 6.

At step 7, the LMF 250 invokes a UE reachability request operation towards the AMF 260 to verify UE 280 reachability. The UE reachability operation request may be a Namf_MT_EnableUEReachability Request message. When the AMF 260 is no longer available, the LMF 250 may use the NRF service in the VPLMN to select another AMF from the same AMF set as the previous AMF 260.

At step 8, when the UE 280 is currently idle but reachable, the AMF 260 performs a network triggered service request in order to place the UE 280 in connected state.

At step 9, the AMF 260 invokes a UE reachability response service operation towards the LMF 250 to confirm UE reachability. The UE reachability response service operation may include a Namf_MT_EnableUEReachability Response message.

At step 10, the LMF 250 may notify the UE 280 and may verify UE privacy requirements based on any privacy requirements received from the HGMLC 220 in steps 4-6. When this occurs, the LMF 250 sends a supplementary services location notification invoke to the UE 280, via the AMF 260, using a Namf_Communication_N1N2MessageTransfer service operation.

At step 11, the UE 280 may notify a user of UE 280 of the location request. The UE 280 verifies user permission when UE privacy is to be verified. The UE 280 then returns a supplementary services location notification response to the LMF 250 indicating whether the user grants or withholds permission for the location request when UE privacy is verified. The supplementary services response may be transferred via the AMF 260 and delivered to the LMF 250 using an Namf_Communication_N1MessageNotify service operation.

At step 12, when the LMF 250 needs to know the serving cell for the UE 280 prior to performing positioning in step 14 and prefers to obtain the serving cell from the AMF 260 rather than the UE 280 or the NG-RAN 270 (e.g., to reduce latency), the LMF 250 invokes an event exposure subscribe service operation towards the AMF 260 to obtain the UE 280 location information. The event exposure subscribe service operation may be a Namf_EventExposure_Subscribe message and may include an immediate one time notification flag.

At step 13, the AMF 260 may return UE location information to the LMF 250 (e.g., serving cell ID).

At step 14, the LMF 250 may perform one or more of positioning procedures. The positioning procedures may include a UE assisted and UE based positioning procedure, a network assisted positioning procedure, and a non-UE assisted network assistance positioning procedure. The positioning procedures are described in greater detail below. The positioning procedures may invoke various positioning methods for positioning of the UE 280. The positioning methods may include, but are not limited to observed time difference of arrival (OTDOA) positioning, global navigation satellite system (GNSS) positioning, and Enhanced cell ID (E-CID) positioning. The LMF 250 may determine the location of the UE 280 using information obtained in this step and/or in step 13.

In the event of an inter-AMF handover for the UE 280 while positioning is in progress, the prior AMF may return an error indication to the LMF 250 when the LMF 250 attempts to send a positioning protocol message to the UE 280 or to the NG-RAN 270. When the LMF 250 subscribes to event notification for inter-AMF handover from the old AMF using the AMF event exposure service operation, the old AMF may notify the LMF 250 when handover occurs. When the LMF 250 is able to access the new AMF, the LMF 250 may resume any of steps 10-14 with the new AMF. For positioning in the UE 280 or the NG-RAN 270 that is already in progress when handover occurs, positioning protocol messages may be returned by the UE 280 or the NG-RAN 270 to the LMF 250 via the new AMF. The messages may include a routing identifier indicating the LMF 250. This may enable a positioning session between the UE 280 and the LMF 250 to continue following an inter-AMF handover.

In steps 15-18, the LMF 250 returns the location estimate to the LCS client 210 via the VGMLC 240 and/or the HGMLC 220. The location estimate may be returned using a Nlmf_ProvideLocation Response and/or LCS Service Response message.

For a non-roaming UE, a subset of the steps of FIG. 2 may be performed, for example, in the case of a non-roaming UE, a VGMLC is not present and thus communications with a VGMLC can be omitted.

In some cases, the LCS request may come from a UE 280 rather than an LCS client 210. An LCS request from a UE may be referred to as a mobile-originated location request (MO-LR). For MO-LR, steps 1-11 of FIG. 2 may be omitted. In place of steps 1-11, the UE 280 may transmit a location service request to the LMF 250 via AMF 260. Steps 12-18 of FIG. 2 may be performed in the case of MO-LR.

Figure 3:
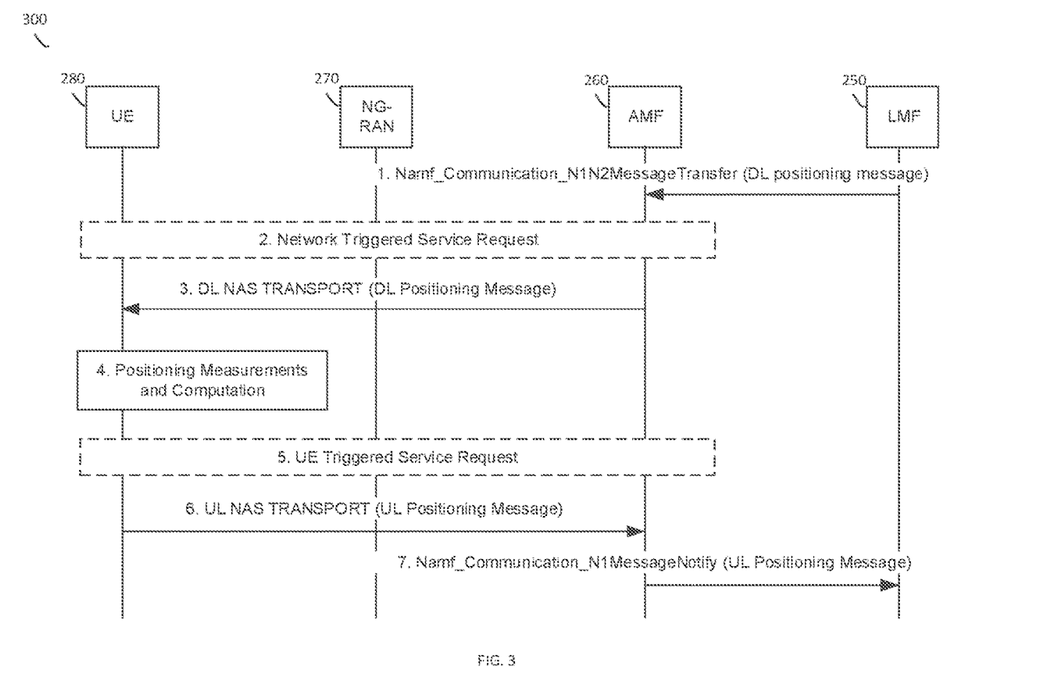
FIG. 3 is a diagram of an embodiment of a UE assisted and UE based positioning procedure.

FIG. 3 is a diagram of an embodiment of a UE assisted and UE based positioning procedure 300. The procedure 300 may be used by an LMF 250 to support UE based positioning, UE assisted positioning, and delivery of assistance data. In some embodiments, the procedure 300 is based on use of LTE positioning protocol (LPP) between the LMF 250 and UE 280. In other embodiments, another protocol such as a New Radio (NR) positioning protocol (NRPP) is used between the LMF 250 and UE 280.

The procedure 300 begins at step 1 where the LMF 250 invokes the Namf_Communication_N1N2MessageTransfer service operation towards the AMF 260 to request the transfer of a downlink (DL) positioning message to the UE 280 via the NG-RAN 270. The service operation may include the DL positioning message. The session ID parameter of the Namf_Communication_N1N2MessageTransfer service operation may be set to an LCS correlation identifier. The DL positioning message may request location information from the UE 280, provide assistance data to the UE 280, or query for the UE 280 capabilities.

At step 2, when the UE 280 is in CM-IDLE state, the AMF 260 initiates a network triggered service request procedure to establish a signaling connection with the UE 280.

At step 3, the AMF 260 forwards the DL positioning message to the UE 280 in a DL NAS TRANSPORT message. The AMF 260 may include a routing identifier in the DL NAS TRANSPORT message identifying the LMF 250.

At step 4, the UE 280 may store any assistance data provided in the DL positioning message and perform any positioning measurements and location computation requested by the DL positioning message.

At step 5, when the UE 280 has entered CM-IDLE state during step 4, the UE 280 instigates a UE triggered service request in order to establish a signaling connection with the AMF 260.

At step 6, the UE 280 returns any location information obtained in step 4 or may return any capabilities requested in step 3 to the AMF 260 in an uplink (UL) positioning message included in a NAS TRANSPORT message. The UE 280 may also include the routing identifier in the UL NAS TRANSPORT message received in step 3.

At step 7, the AMF 260 invokes the Namf_Communication_N1MessageNotify service operation towards the LMF 250 indicated by the routing identifier received in step 6. The service operation may include the UL positioning message received in step 6 and the LCS correlation identifier. Steps 6 and 7 may be repeated when the UE 280 needs to send multiple messages to respond to the request received in step 3. Steps 1 to 7 may be repeated to send new assistance data, and to request further location information and further UE capabilities.

In some embodiments, the LMF 250 may include a routing identifier identifying the LMF 250 in any positioning message intended for the UE 280 that is sent to the AMF 260 at step 1. The AMF 260 may then forward the positioning message to the UE 280 in the NAS transport message at step 3.

Figure 4:
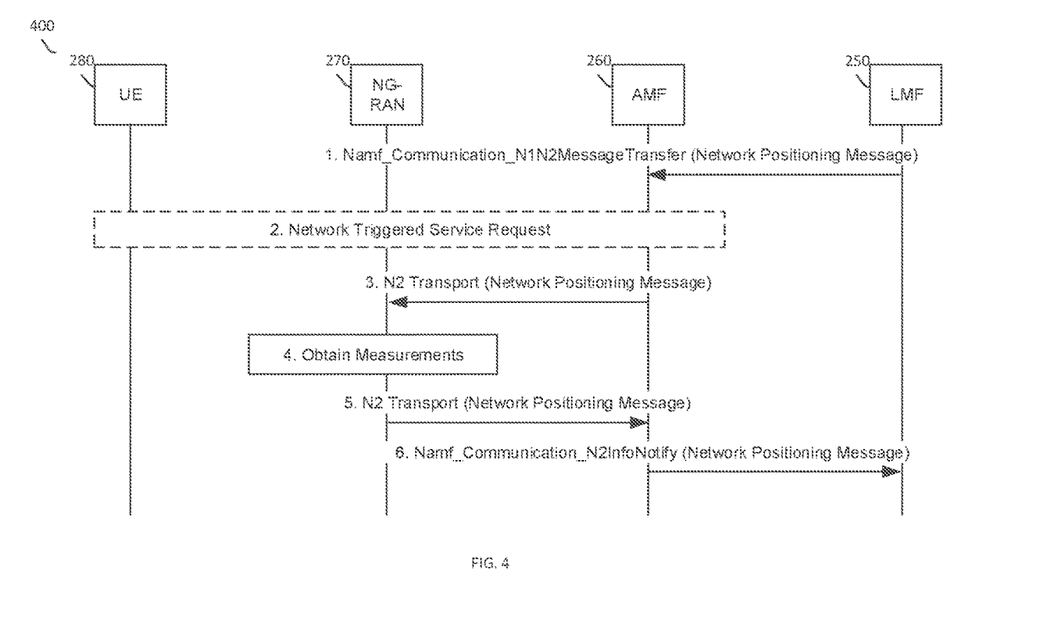
FIG. 4 is a diagram of an embodiment of a network assisted positioning procedure.

FIG. 4 is a diagram of an embodiment of a network assisted positioning procedure 400. Procedure 400 may be used by an LMF 250 to support network assisted and network based positioning. The procedure 400 may be based on an NR positioning protocol A (NRPPa) protocol between the LMF 250 and NG-RAN 270.

The procedure 400 begins at step 1 where the LMF 250 invokes the Namf_Communication_N1N2MessageTransfer service operation towards the AMF 260 to request the transfer of a network positioning message to the NG-RAN 270 node (gNB or ng-eNB) for the UE 280. The service operation may include the network positioning message and the LCS correlation identifier. The network positioning message may request location information for the UE 280 from the NG-RAN 270.

At step 2, when the UE 280 is in CM-IDLE state, the AMF 260 initiates a network triggered service request procedure to establish a signaling connection with the UE 280.

At step 3, The AMF 260 forwards the network positioning message to the NG-RAN 270 node in an N2 Transport message. The AMF 260 may include a routing identifier in the N2 Transport message identifying the LMF 250 (e.g., a global address of the LMF 250).

At step 4, the NG-RAN 270 node obtains any location information for the UE 280 requested in step 3.

At step 5, the NG-RAN 270 node returns any location information obtained in step 4 to the AMF 260 in a network positioning message included in an N2 transport message. The NG-RAN 270 node may also include the routing identifier in the N2 Transport message received in step 3.

At step 6, the AMF 260 invokes the Namf_Communication_N2InfoNotify service towards the LMF 250 indicated by the routing identifier received in step 5. The service operation may include the network positioning message received in step 5 and the LCS correlation identifier. Steps 1 to 6 may be repeated to request further location information and further NG-RAN capabilities.

Figure 5:
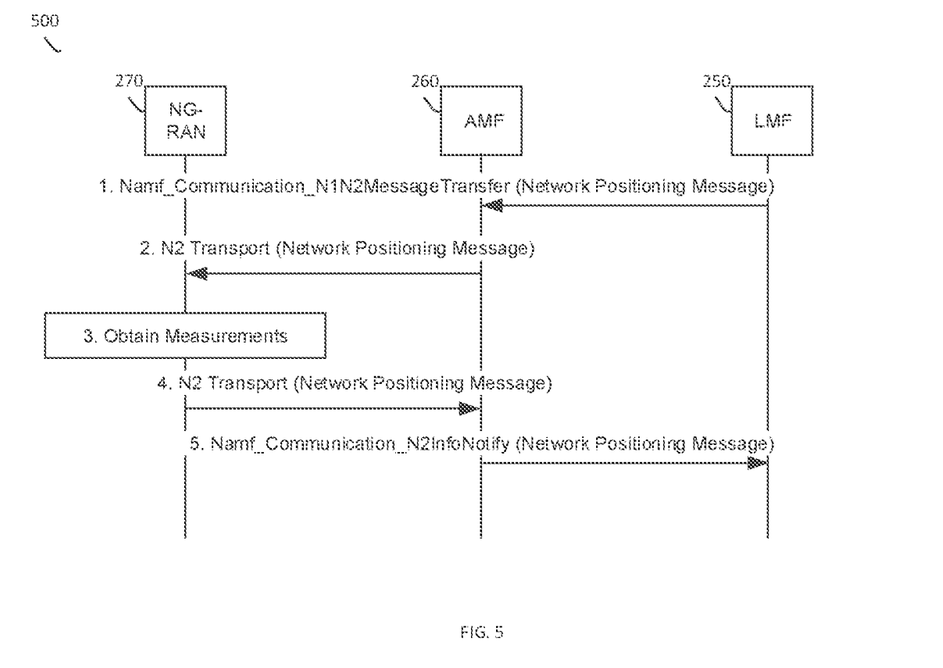
FIG. 5 is a diagram of an embodiment of a non-UE assisted network assistance positioning procedure.

FIG. 5 is a diagram of an embodiment of a non-UE associated network assistance positioning procedure 500. Procedure 500 may be used by an LMF 250 to support network assisted and network based positioning. Procedure 500 may not be associated with a UE location session. In some cases, procedure 500 may be used to obtain network assistance data from a NG-RAN 270 node (e.g., gNB or ng-eNB). Procedure 500 may be based on an NRPPa protocol between the LMF 250 and NG-RAN 270. Procedure 500 may be used for retrieving configuration or measurement information from network nodes that may then be used to formulate assistance data for use in positioning. For example, retrieving RAN nodes' configurations for transmitting OTDOA reference signals. In this example, the LMF 250 collects information about a large population of RAN nodes, and later when a UE needs to be positioned, the LMF 250 provides the configuration information for nearby RAN nodes as part of the UE's assistance data.

The procedure 500 begins at step 1 where the LMF 250 invokes the Namf_Communication_N1N2MessageTransfer service operation towards the AMF 260 to request the transfer of a network positioning message to a NG-RAN 270 node (gNB or ng-eNB) in the NG-RAN 270. The service operation may include the network positioning message and the NG-RAN 270 node identity. The network positioning message may request position related information from the NG-RAN 270.

At step 2, the AMF 260 forwards the network positioning message to the NG-RAN 270 node indicated in step 1 in an N2 transport message. The AMF 260 may include a routing identifier in the N2 Transport message identifying the LMF 250.

At step 3, the NG-RAN 270 node obtains any position related information requested in step 2.

At step 4, the NG-RAN 270 node returns any position related information obtained in step 3 to the AMF 260 in a network positioning message included in an N2 transport message. The NG-RAN 270 node may also include the routing identifier in the N2 transport message received in step 2.

At step 5, the AMF 260 invokes the Namf_Communication_N2InfoNotify service operation towards the LMF 250 indicated by the routing identifier received in step 4. The service operation may include the network positioning message received in step 4 and the UE identifier. Steps 1 to 5 may be repeated to request further position related information from the NG-RAN 270.

Figure 6:
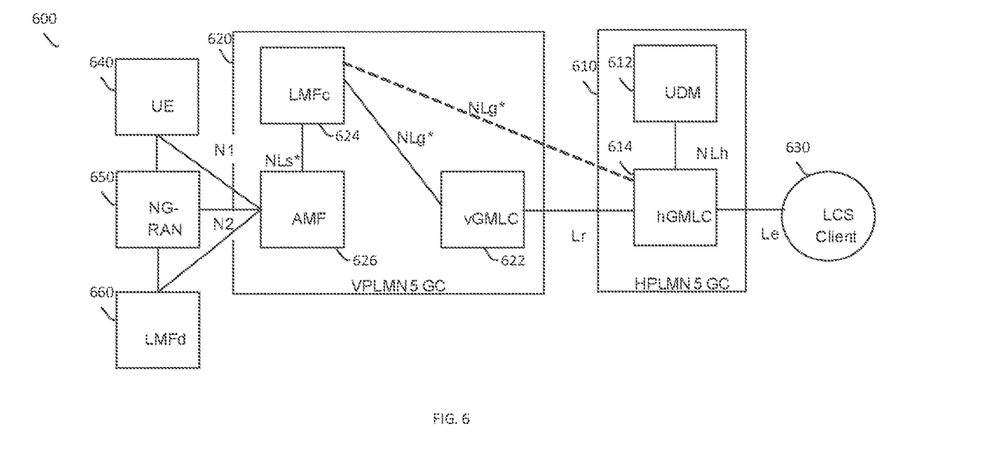
FIG. 6 is a diagram of an embodiment of a roaming 5G network LMF centric positioning architecture with distributed location management function.

FIG. 6 is a diagram of an embodiment of a roaming 5G network 600 LMF centric positioning architecture with distributed location management function. The functionality of the components of 5G network 600 may be similar to the similarly named components of the 5G network 100 described in FIG. 1. Likewise, while a single instance of each node and a single UE 640 is shown in FIG. 6, multiple instances of some or all components may be present in a 5G network. 5G network 600 includes an HPLMN 5G core 610, a VPLMN 5G core 620, an LCS client 630, a UE 640, an NG-RAN 650, and an LMFd 660. UE 640 may be roaming and attached to NG-RAN 650 and associated with AMF 626 of the VPLMN 5G core 620. In the case where UE 640 is not roaming, UE 640 may be attached to an AMF (not pictured) in the HPLMN 5G core 610. In addition to LMFc 624 of the VPLMN 5G core 620, an LMFd 660 may be located at or near a NG-RAN 650 node (e.g., gNB or NG-eNB). The LMFd 660 may be considered part of the VPLMN 5G core 620 or part of the NG-RAN 650. The LMFd 660 may be in communication with UE 640 via NG-RAN 650 or via a combination of AMF 626 and NG-RAN 650. The LMFd 660 may be in communication with LMFc 624 via AMF 626.

When the LCS client 630 initiates positioning of the UE 640, the LCS client 630 contacts the HGMLC 614 for the HPLMN 5G core 610. HPLMN 5G core 610 may be the home PLMN of the UE 640. HGMLC 614 interacts with the UDM 612 regarding privacy policies and positioning permissions of the UE 640 relative to the LCS client 630. When positioning of the UE 640 is permitted for the LCS client 630, the HGMLC 614 contacts the VGMLC 622 to acquire an address for the LMFc 624. In some embodiments, when the UE 640 joins the VPLMN 5G core 620, the HGMLC 614 may be provided with an address for the LMFc 624. In either case, the HGMLC 614 contacts the LMFc 624 to request positioning of the UE 640. LMFc 624 determines whether to use the LMFd 660 for positioning. In some cases, multiple LMFds are present in the 5G network 600. In these cases, in addition to determining whether or not to use an LMFd for positioning, the LMFc 624 also determines which of the LMFds to use for positioning. LMFd 660 may be selected to perform positioning for the UE 640. LMFd 660 may perform positioning using one or more of the procedures and/or methods described in conjunction with step 14 of FIG. 2, or some other positioning technique. LMFd 660 returns positioning information to the LMFc 624, which may in turn return the positioning information to the LCS client 630. Certain nodes may act as intermediaries in handling the positioning information. For example, the AMF 226 may receive the positioning information from the LMFd 660 and forward it to the LMFc 624. These procedures shall be discussed in greater detail below.

Figure 7:
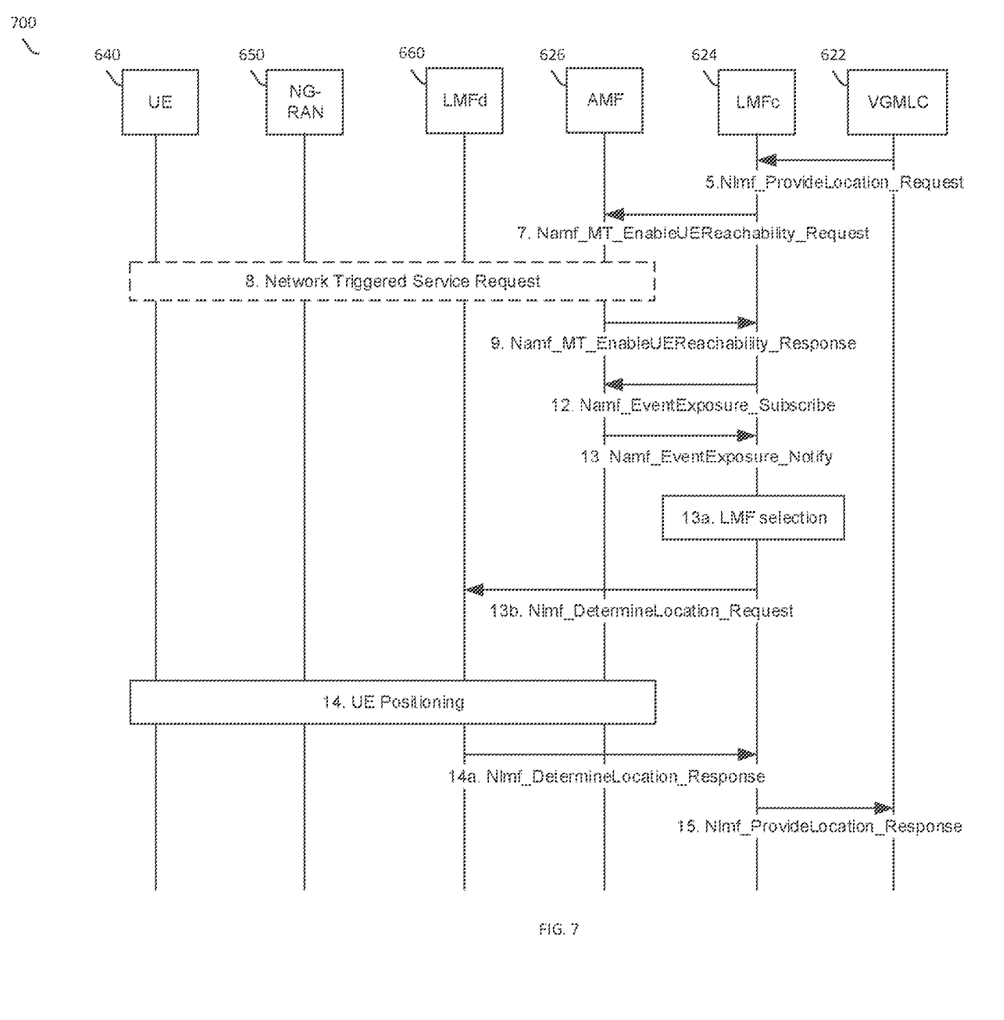
FIG. 7 is a diagram of an embodiment of a 5G MT-LR for a roaming UE in a network with a distributed location management function.

FIG. 7 is a diagram of an embodiment of a 5G MT-LR 700 for a roaming UE 640 in a network with a distributed location management function. Prior to step 5, MT-LR 700 may perform steps similar to steps 1-4 of FIG. 2. For example, the VGMLC 622 may send a provide location request to the LMFc 624. Steps 5, 7-9, 12, 13, 14, and 15 of FIG. 7 may be performed in a manner similar to the corresponding steps in FIG. 2.

At step 13a, the LMFc 624 determines where to perform LCS, locally or remotely at an LMFd, e.g., LMFd 660. The LMFc 624 may receive a list of available LMFds prior to step 13a, or may request the list as part of step 13a. The LMFc 624 may determine that the LMFd 660 is available and preferable for the LCS. LMFc 624 may determine to use the LMFd 660 for LCS based upon reachability information of the UE 640 provided by the AMF 626 as part of step 9 and/or step 13. The reachability information may include information provided with an event subscribe request that indicates the serving cell of the UE 640 (e.g., the NG-RAN 650 that the UE 640 is attached to). LMFc 624 may select the LMFd 660 from one or more available LMFds for LCS based upon various criteria. The criteria may include, but is not limited to, reachability information, positioning QoS (e.g., requested latency, QoS class, positioning accuracy), proximity of the requestor to the UE 640, access type (e.g., third generation partnership project (3GPP), non-3GPP (N3GPP)), 5G access node type (e.g., 5G NR or eLTE), serving access node (e.g., gNB, NG-eNB) of the UE 640, RAN configuration information, indication of a single LCS report or multiple LCS reports, _duration of event reporting, network slicing information (e.g., single-network slices selection assistance information (S-NSSAI), network slice instance (NSI) ID), network topology, choice of positioning method, loading on the LMFc 624 and/or the LMFd 660, and/or capabilities of the LMFc 624 and/or the LMFd 660. One or more of the foregoing criteria may also be used by the LMFc 624 in determining whether or not to perform the LCS locally at the LMFc 624 or remotely at the LMFd 660.

At step 13*b*, the LMFc 624 sends a location request to the LMFd 660. The location request may include serving cell information, e.g., the cell the UE is attached to, client type, e.g., the type of UE, and/or a QoS of the LCS, or other conditions for performing the LCS. The location request may be a newly created message, the provide location request from step 5, or a variation or subset of the provide location request from step 5. The location request may be a Nlmf_DetermineLocation_Request service operation. From the viewpoint of the other nodes in the network, the LMFc 624 may act as a proxy for the LMFd 660. After UE positioning is completed at step 14, the LMFd 660 may provide positioning information to the LMFc 624 at step 14*a*. The positioning information may be transmitted in a Nlmf_DetermineLocation_Response service operation. The positioning information may include a position of the UE 640, or measurement results received from the UE 640 and/or the NG-RAN 650.

The positioning operation of step 14 may include various interactions between the LMFd 660, the NG-RAN 650, and the UE 640. In some embodiments, these interactions may also involve the AMF 626, e.g., messages sent from the LMFd 660 to the NG-RAN 650 or the UE 640 may be routed by the AMF 626. The interactions may be defined by positioning procedures and positioning methods. The positioning procedure may relate to which entity initiates and controls the various steps of the positioning, and where the final computation of positioning is done. Several positioning procedures are described in conjunction with FIGS. 3-5. A positioning method may relate to what types of measurements are taken and how they are processed into a position estimate. Not all positioning methods may be supported for all types of procedures. For example, OTDOA positioning (in LTE) may be UE-assisted, but may not be UE-based or network-assisted. UE-based OTDOA may be supported, but it is currently excluded from LTE. Network-assisted OTDOA may not be possible, because the positioning method may depend on having measurements from the UE. GNSS positioning may be either UE-based or UE-assisted, but may not be network-assisted because GNSS positioning may depend on measurements from the UE. E-CID may be either UE-assisted or network-assisted, but may not be UE-based.

As an example, for UL E-CID positioning, the LMFd 660 may interact with the NG-RAN 650 node to retrieve various measurements that may be used in positioning the UE 640. As another example, in OTDOA positioning, the LMFd 660 may interact with the UE 640 to retrieve measurements taken on DL signals (e.g., positioning reference signals). In yet another example, for UL time difference of arrival (UTDOA), the LMFd 660 may interact with one or more location measurement units (LMUs) to retrieve UL measurements.

In some embodiments, the results of the positioning procedures and positioning methods may be transmitted back to the LMFc 624 for calculation of the position of the UE 640. For example, the LMFd 660 may collect all the measurements and then pass them to the LMFc 624 which may make the final calculations of position. This may also include taking into account positioning information obtained by means of other techniques (e.g., non-3GPP methods) for a hybrid positioning result. An example hybrid positioning may include combining a wireless local area network (WLAN) positioning estimate (non-3GPP) with OTDOA measurements. In other embodiments, the LMFd 660 may calculate the position of the UE 640 and transmit only the resulting location estimate to the LMFc 624.

Figure 8:
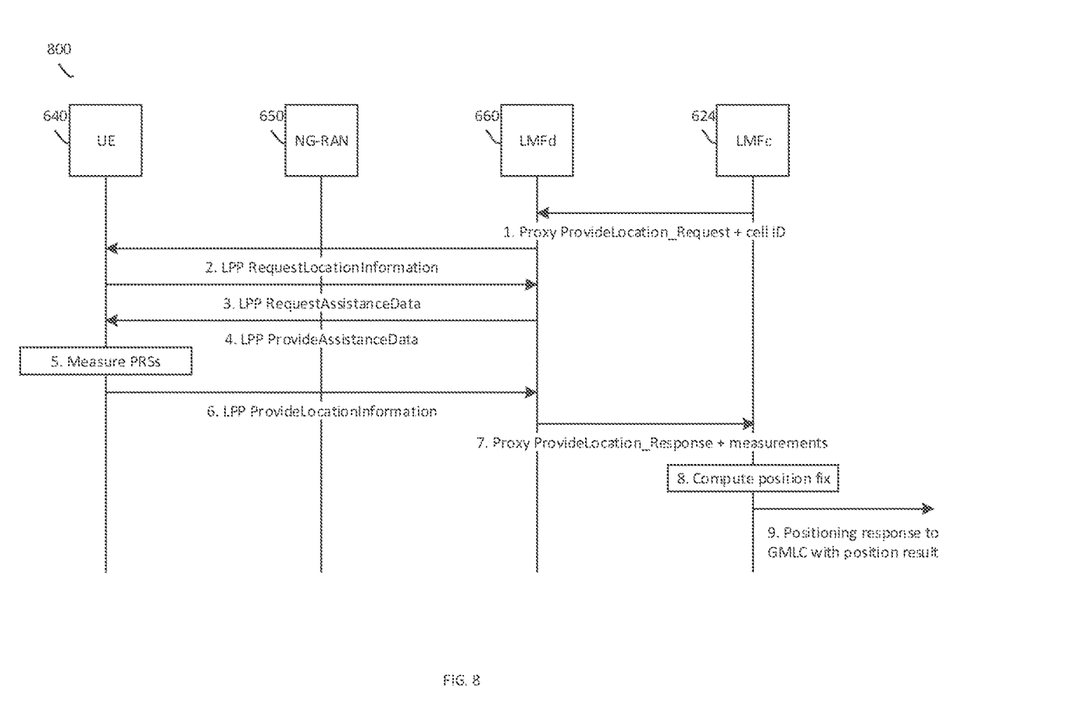
FIG. 8 is a diagram of an embodiment of distributed location management function positioning with final calculation at the LMF.

FIG. 8 is a diagram of an embodiment of distributed location management function positioning 800 with final calculation at the LMFc 624. These steps may take place during step 14 of FIG. 7. In this example, an OTDOA positioning method is used. At step 1, the LMFc 624 submits a location request to the LMFd 660. LMFd 660 may use LPP to request location information from the UE 640 at step 2. UE 640 may determine to use OTDOA positioning and may request assistance data at step 3. The assistance data may include the position of several NG-RAN 650 nodes used in triangulating the UE 640 position. The assistance data is transmitted to the UE 640 at step 4. At step 5, the UE 640 measures positioning reference signals (PRSs) transmitted from the NG-RAN 650 nodes. At step 6, the UE 640 provides the measurements to the LMFd 660. LMFd 660 may forward the measurements on to the LMFc 624 at step 7. At step 8, the LMFc 624 calculates the position of the UE 640 using the measurement results. At step 9, the LMFc 624 provides the position of the UE 640 to the requesting GMLC (not pictured). In some embodiments, the messages at steps 2, 3, 4, and 6 exchanged between the LMFd 660 and the UE 640 may be routed through the AMF (not pictured).

Figure 9:
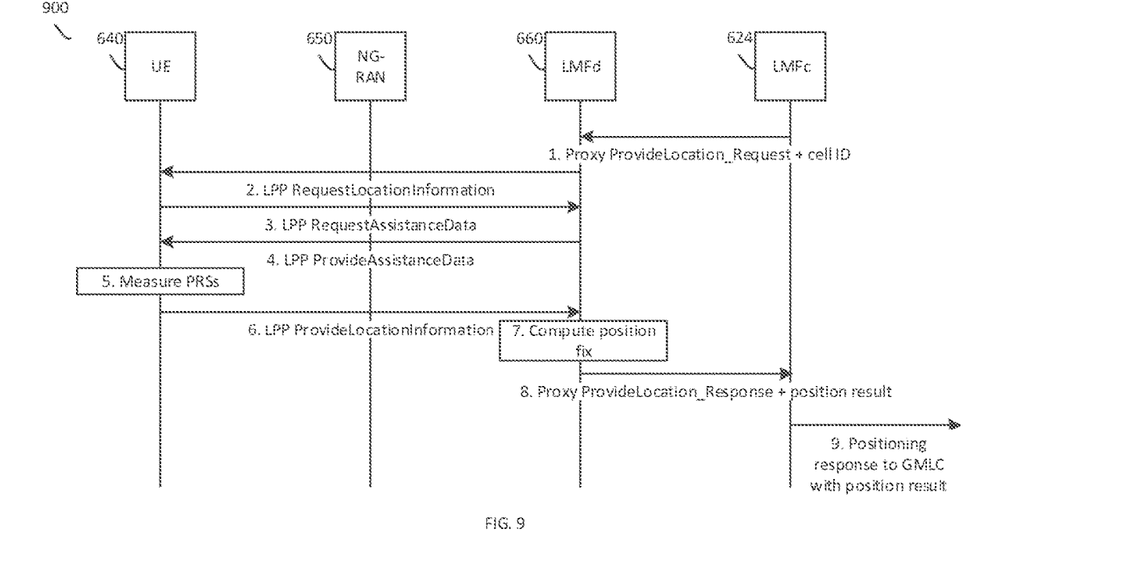
FIG. 9 is a diagram of an embodiment of distributed location management function positioning with final calculation at the LMFd.

FIG. 9 is a diagram of an embodiment of distributed location management function positioning 900 with final calculation at the LMFd 660. These steps may take place during step 14 of FIG. 7. In this example, an OTDOA positioning method is used. At step 1, the LMFc 624 submits a location request to the LMFd 660. At step 2, the LMFd 660 uses LPP to request location information from the UE 640. UE 640 may determine to use OTDOA positioning and request assistance data at step 3. The assistance data may include the position of several NG-RAN 650 nodes used in triangulating the UE 640 position. The assistance data is transmitted to the UE 640 at step 4. At step 5, the UE 640 measures PRSs transmitted from the NG-RAN 650 nodes. At step 6, the UE 640 provides the measurements to the LMFd 660. At step 7, the LMFd 660 calculates the position of the UE 640 using the measurement results. LMFd 660 forwards the position of the UE 640 to the LMFc 624 at step 8. At step 9, the LMFc 624 may provide the position of the UE 640 to the requesting GMLC (not pictured). In some embodiments, the messages at steps 2, 3, 4, and 6 exchanged between the LMFd 660 and the UE 640 may be routed through the AMF (not pictured).

Figure 10:
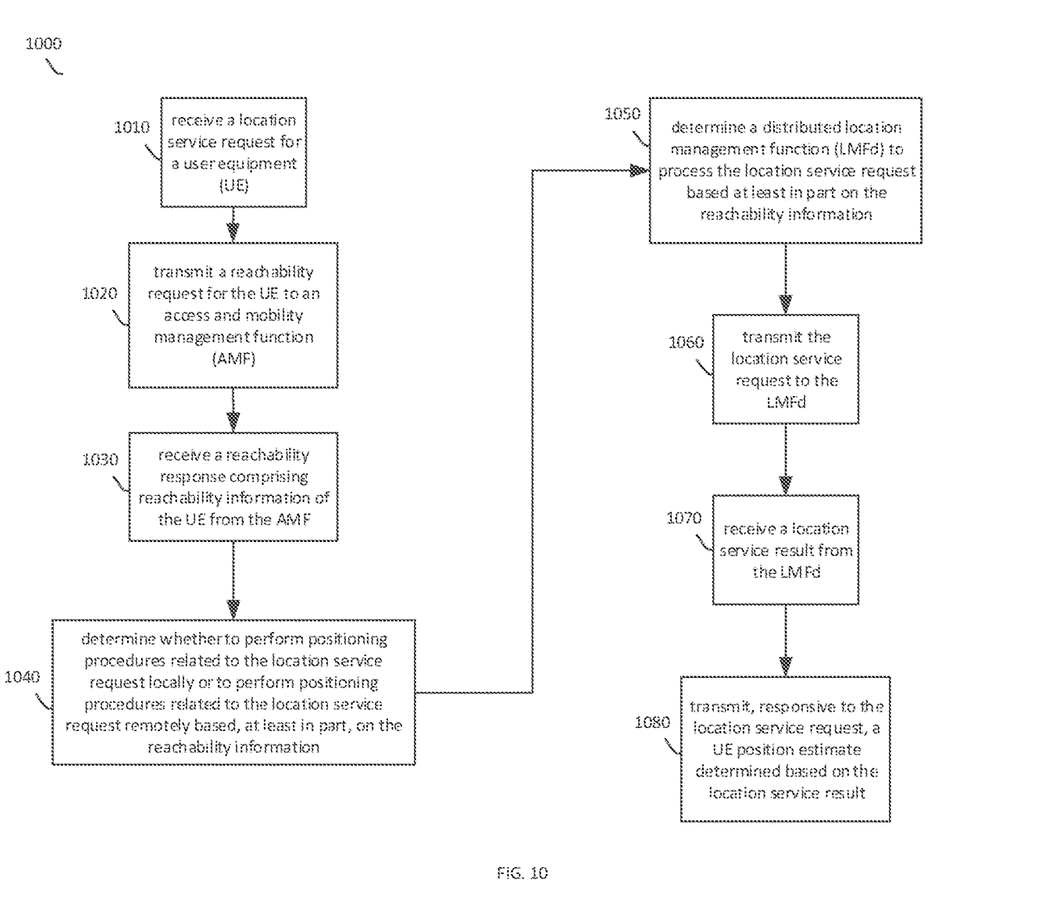
FIG. 10 is a flowchart of an embodiment of a method for location services in a LMFc.

FIG. 10 is a flowchart of an embodiment of a method 1000 for location services in an LMF. The method begins at block 1010 when an LMFc receives a location service request for a UE. The UE may be attached to a PLMN where the LMFc is located. The location request may be received from a GMLC. The GMLC may be located in the PLMN where the LMFc is located and/or may be located in a home PLMN of the UE. In some cases, the location request may originate from the UE, in these cases, the location request may be received from an AMF in the PLMN where the LMFc and the UE are located.

At block 1020, the LMFc transmits a reachability request for the UE to an AMF. The reachability request verifies that the UE is reachable and requests reachability information of the UE, for example, a serving cell of the UE. At block 1030 the LMFc receives a reachability response comprising reachability information, for example, a serving cell identity of the UE from the AMF. At block 1040, the LMFc determines whether to perform positioning procedures related to the location service request locally or to perform positioning procedures related to the location service request remotely. In an embodiment the LMFc may consider a desired positioning QoS in determining whether the LMFc or LMFd will handle the positioning request. For example, when the desired positioning QoS allows for a relatively high latency, the LMFc may handle the positioning request. Likewise, when the desired positioning QoS requires a relatively low latency, then the LMFc may decide to have the LMFd handle the positioning request. In another embodiment, the LMFc may make this determination based upon loading of the LMFc and LMFd. For example, loading may include current bandwidth usage, current processor usage, a number of pending jobs, etc. When loading is above a certain threshold at either node, the other node may be selected for handling the location service request. The LMFc may consider other criteria and/or a combination of criteria in determining whether to use an LMFd, including but not limited to LMFc and LMFd loading, UE reachability, positioning QoS, e.g., requested latency, QoS class, positioning accuracy, network topology, choice of positioning method, capabilities of the LMFc and/or LMFd, UE location in the network, and/or location of the LMFc and/or LMFd in the network.

Blocks 1050 through 1080 may be performed when the LMFs determines to perform the positioning procedures remotely at an LMFd. At block 1050, the LMFc determines an LMFd to process the location service request based at least in part on the serving cell identity. Selecting an LMFd may be based upon a number of criteria to include UE location in the network, LMFd location in the network, UE reachability, positioning QoS, e.g., requested latency, QoS class, positioning accuracy, choice of positioning method, loading on the LMFd, and capabilities of the LMFd. In an embodiment, the LMF may select an LMFd based on its proximity to an NG-RAN node that serves the UE. For example, the LMFc may select an LMFd collocated with the NG-RAN node that serves the UE. In some embodiments, there may not be an LMFd at every NG-RAN node and it may be necessary to choose and LMFd based on proximity to the UE.

At block 1060, the LMFc transmits the location service request to the LMFd selected at block 1050. At block 1070, the LMFc receives a location service result from the LMFd. The location service result may include a calculated position of the UE, or the measurements taken by the UE and/or RAN node. When the LMFd provides the measurements taken by the UE and/or RAN node, the LMFc may calculate the location of the UE based upon the measurements. At block 1080, the LMFc transmits, responsive to the location service request, a UE position estimate determined based on the location service result to the requester of the position, e.g., the GMLC.

Figure 11:
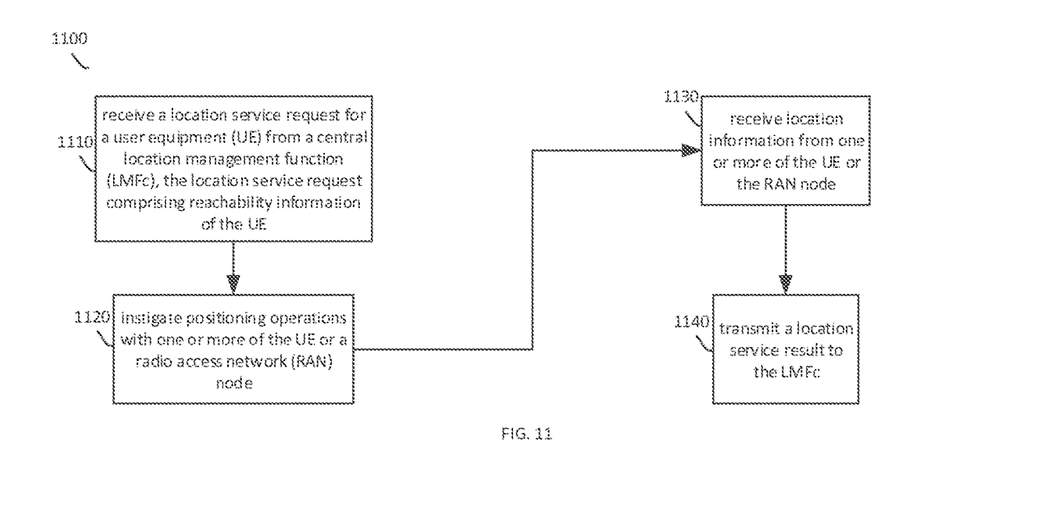
FIG. 11 is a flowchart of an embodiment of a method for location services in a LMFd.

FIG. 11 is a flowchart of an embodiment of a method 1100 for location services in an LMFd. The method 1100 begins at block 1110 where an LMFd receives a location service request for a UE from an LMFc, the location service request comprising reachability information of the UE. At block 1120, the LMFd instigate positioning operations with one or more of the UE or a radio access network (RAN) node. The positioning operations may include requesting positioning measurements and/or transferring location assistance data. The positioning operations may comprise a message of an LPP protocol, e.g., a RequestLocationInformation message or a ProvideAssistanceData message. The LMFd may determine where to send a positioning message based on the positioning procedure and/or the positioning method selected for use in the positioning operations. At block 1130, the LMFd receives location information from one or more of the UE or the RAN node, e.g., measurements or a position estimate. At block 1140, the LMFd transmits a location service result to the LMFc. The location service result may include measurements received form the UE and/or RAN node. The location service result may include a location of the UE calculated by the LMFd based on the location information received from the UE and/or RAN node. The location service result may include a position estimate computed by the UE.

Figure 12:
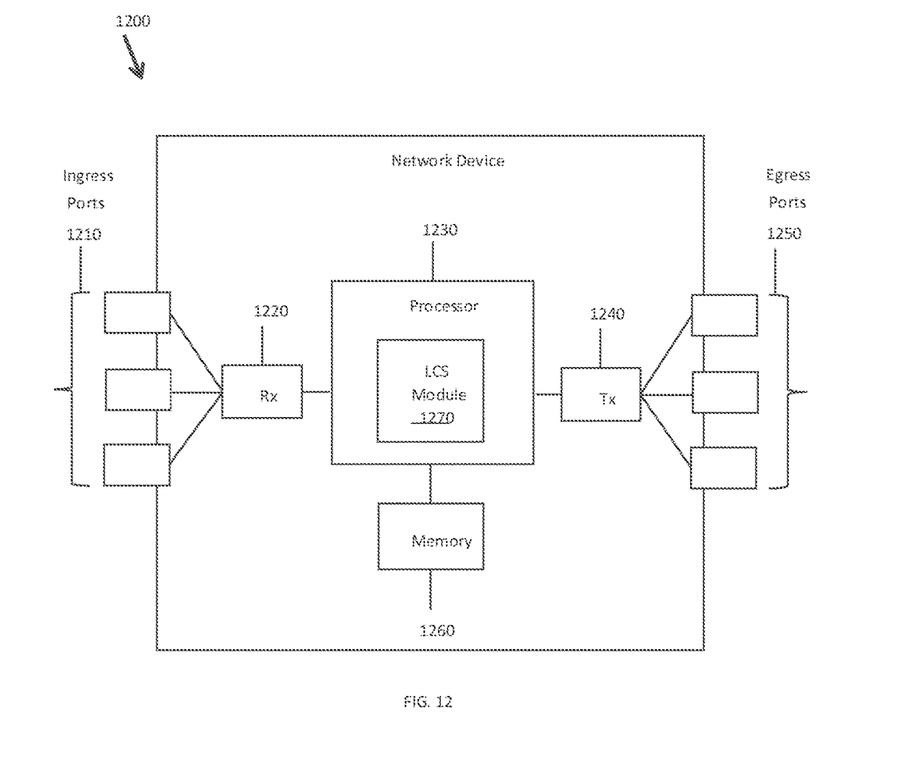
FIG. 12 is a schematic diagram of a network device according to an embodiment of the disclosure.

FIG. 12 is a schematic diagram of a network device 1200 (e.g., a network node) according to an embodiment of the disclosure. The network device 1200 is suitable for implementing the disclosed embodiments as described herein. In an embodiment, the network device 1200 may be a LMF or LMFd, or other components described herein. The network device 1200 may comprise ingress ports 1210 and receiver units (Rx) 1220 for receiving data; a processor, logic unit, or central processing unit (CPU) 1230 to process the data; transmitter units (Tx) 1240 and egress ports 1250 for transmitting the data; and a memory 1260 for storing the data. The network device 1200 may also comprise optical-to-electrical (OE) components and electrical-to-optical (EO) components coupled to the ingress ports 1210, the receiver units 1220, the transmitter units 1240, and the egress ports 1250 for egress or ingress of optical or electrical signals.

The processor 1230 may be implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 may be in communication with the ingress ports 1210, receiver units 1220, transmitter units 1240, egress ports 1250, and memory 1260. The processor 1230 may comprise a LCS module 1270. The LCS module 1270 implements the disclosed embodiments described above. For instance, the LCS module 1270 implements, processes, prepares, or provides the various LCS operations. The inclusion of the LCS module 1270 therefore provides a substantial improvement to the functionality of the network device 1200 and effects a transformation of the network device 1200 to a different state. Alternatively, the LCS module 1270 is implemented as instructions stored in the memory 1260 and executed by the processor 1230.

The memory 1260 may comprise one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM).

The following are incorporated herein by reference for all purposes: 3GPP TS23.012, 3GPP TS23.071, 3GPP TS23.271, 3GPP TS23.501, 3GPP TS23.502, and 3GPP TR23.731.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A location management function (LMF) comprising:
a memory having instructions stored therein; and
one or more processors in communication with the memory, wherein the one or more processors execute the instructions to:
receive a location service request for a user equipment (UE) from a network node, the location service request comprising reachability information of the UE;
instigate positioning operations directly with one or more of the UE or a radio access network (RAN) node, wherein the positioning operations bypass do not include an access and mobility management function (AMF);
receive location information from one or more of the UE or the RAN node; and
transmit a location service result to the network node.

2. The LMF of claim 1, wherein the positioning operations comprise transmitting location assistance data to the UE.

3. The LMF of claim 1, wherein the location service result comprises positioning measurements.

4. The LMF of claim 1, wherein the location service result comprises a UE location estimate.

5. The LMF of claim 4, wherein the one or more processors are further configured to calculate a UE position estimate based on the location information.

6. The LMF of claim 1, wherein the network node is one of an AMF or another LMF.

7. A method for performing location services, the method comprising:
receiving, by a location management function (LMF), a location service request for a user equipment (UE) from a network node, the location service request comprising reachability information of the UE;
instigating, by the LMF, positioning operations directly with one or more of the UE or a radio access network (RAN) node, wherein the positioning operations bypass an access and mobility management function (AMF);
receiving, by the LMF, location information from one or more of the UE or the RAN node; and
transmitting, by the LMF, a location service result to the network node.

8. The method of claim 7, wherein the positioning operations comprise transmitting location assistance data to the UE.

9. The method of claim 7, wherein the location service result comprises positioning measurements.

10. The method of claim 7, wherein the location service result comprises a UE location estimate.

11. The method of claim 10 further comprising calculating a UE position estimate based on the location information.

12. The method of claim 7, wherein the network node is one of an AMF or another LMF.

13. A non-transitory computer readable storage medium comprising instructions, the instructions executable by a location management function (LMF) to cause the LMF to:
receive a location service request for a user equipment (UE) from a network node, the location service request comprising reachability information of the UE;
instigate positioning operations directly with one or more of the UE or a radio access network (RAN) node, wherein the positioning operations bypass an access and mobility management function (AMF);
receive location information from one or more of the UE or the RAN node; and
transmit a location service result to the network node.

14. The non-transitory computer readable storage medium of claim 13, wherein the positioning operations comprise transmitting location assistance data to the UE.

15. The non-transitory computer readable storage medium of claim 13, wherein the location service result comprises positioning measurements.

16. The non-transitory computer readable storage medium of claim 13, wherein the location service result comprises a UE location estimate.

17. The non-transitory computer readable storage medium of claim 16, wherein the instructions further cause the network node to calculate a UE position estimate based on the location information.

18. The non-transitory computer readable storage medium of claim 13, wherein the network node is one of an AMF or another LMF.

19. The LMF of claim 1, wherein the positioning operations are based on New Radio (NR) positioning protocol (NRPP).

20. The method of claim 7, wherein the positioning operations are based on New Radio (NR) positioning protocol (NRPP).

21. The non-transitory computer readable storage medium of claim 13, wherein the positioning operations are based on New Radio (NR) positioning protocol (NRPP).

* * * * *

UNITED STATES PATENT AND TRADEMARK OFFICE
CERTIFICATE OF CORRECTION

PATENT NO. : 11,356,809 B2
APPLICATION NO. : 16/983632
DATED : June 7, 2022
INVENTOR(S) : Nathan Edward Tenny et al.

Page 1 of 1

It is certified that error appears in the above-identified patent and that said Letters Patent is hereby corrected as shown below:

In the Claims

Column 17, Claim 1, Lines 22-38, should read:
1. A location management function (LMF) comprising:
    a memory having instructions stored therein; and
    one or more processors in communication with the memory, wherein the one or more processors execute the instructions to:
        receive a location service request for a user equipment (UE) from a network node, the location service request comprising reachability information of the UE;
        instigate positioning operations directly with one or more of the UE or a radio access network (RAN) node, wherein the positioning operations bypass an access and mobility management function (AMF);
        receive location information from one or more of the UE or the RAN node; and
        transmit a location service result to the network node.

Signed and Sealed this
Second Day of August, 2022

Katherine Kelly Vidal
*Director of the United States Patent and Trademark Office*